(12) United States Patent
Shalon

(10) Patent No.: US 9,158,125 B2
(45) Date of Patent: Oct. 13, 2015

(54) UNIVERSAL EYEWEAR

(71) Applicant: THINOPTICS, INC., Palo Alto, CA (US)

(72) Inventor: Tadmor Shalon, Palo Alto, CA (US)

(73) Assignee: THINOPTICS, INC., Palo Alto, CA (US)

( * ) Notice: Subject to any disclaimer, the term of this patent is extended or adjusted under 35 U.S.C. 154(b) by 0 days.

(21) Appl. No.: 14/659,153

(22) Filed: Mar. 16, 2015

(65) Prior Publication Data

US 2015/0185498 A1   Jul. 2, 2015

Related U.S. Application Data

(63) Continuation of application No. 14/284,879, filed on May 22, 2014, now Pat. No. 9,081,209, which is a continuation-in-part of application No. 13/899,606, filed on May 22, 2013, now Pat. No. 9,069,189, which is a continuation of application No. PCT/IB2011/055208, filed on Nov. 21, 2011.

(60) Provisional application No. 61/344,930, filed on Nov. 22, 2010, provisional application No. 61/826,127, filed on May 22, 2013.

(51) Int. Cl.
| | |
|---|---|
| *G02C 5/00* | (2006.01) |
| *G02C 5/12* | (2006.01) |
| *G02C 5/06* | (2006.01) |
| *A45C 11/04* | (2006.01) |
| *G02C 5/22* | (2006.01) |
| *A45C 11/00* | (2006.01) |

(52) U.S. Cl.
CPC ............... *G02C 5/128* (2013.01); *A45C 11/04* (2013.01); *G02C 5/06* (2013.01); *G02C 5/122* (2013.01); *G02C 5/2263* (2013.01); *A45C 2011/002* (2013.01)

(58) Field of Classification Search
CPC .......... G02C 5/128; G02C 5/06; G02C 5/008; G02C 5/2263; G02C 5/02; G02C 5/122; A45C 11/04; A45C 11/00; A45C 2011/002
USPC .............. 351/63–65, 69–70, 79–80, 136–137
See application file for complete search history.

(56) References Cited

U.S. PATENT DOCUMENTS

| | | | |
|---|---|---|---|
| 261,799 A | 7/1882 | Woodward | |
| 380,491 A | 4/1888 | Kahn | |

(Continued)

FOREIGN PATENT DOCUMENTS

| | | |
|---|---|---|
| DE | 4407313 A1 | 9/1995 |
| EP | 2016457 B1 | 6/2011 |
| WO | WO2010/086650 A1 | 8/2010 |

OTHER PUBLICATIONS

Pince-Nez; www.en.wikipedia.org/wiki/Pince-nez; pp. 1-4; printed Sep. 20, 2013.

*Primary Examiner* — Huy K Mai
*Assistant Examiner* — Daniele Manikeu
(74) *Attorney, Agent, or Firm* — Shay Glenn LLP

(57) ABSTRACT

An eyewear system including eyeglasses having first and second lenses; first and second nose pads; and a bridge operably connecting the first and second lenses, the bridge being bendable from a bridge rest position to permit relative movement between the first and second nose pads and providing a bridge pinch force of 50 g or less between the nose pads when the nose pads are moved 7 mm or less from the bridge rest position.

28 Claims, 9 Drawing Sheets

(56) References Cited

U.S. PATENT DOCUMENTS

| | | | |
|---|---|---|---|
| 470,029 A | 3/1892 | Wood | |
| 529,988 A | 11/1894 | Wood | |
| 585,619 A | 6/1897 | Cottet, Jr. | |
| 677,996 A | 7/1901 | Kleinert | |
| 1,017,579 A | 2/1912 | Nicol | |
| 1,919,938 A | 7/1933 | Fielding | |
| 1,931,634 A | 10/1933 | Tanasso et al. | |
| 2,004,445 A | 6/1935 | Meyer | |
| 2,023,469 A | 12/1935 | Grier | |
| 2,036,591 A | 4/1936 | Marciano | |
| 2,047,646 A | 7/1936 | Nerney | |
| 2,061,411 A | 11/1936 | Tanasso et al. | |
| 2,234,729 A | 3/1941 | Montalvo-Guenard | |
| 2,478,921 A | 8/1949 | Hansen | |
| D209,016 S | 10/1967 | Weissman | |
| 3,395,964 A * | 8/1968 | Nieder | 351/63 |
| D220,597 S | 4/1971 | Dawson et al. | |
| D247,111 S | 1/1978 | Olivan | |
| 4,600,279 A * | 7/1986 | Tabacchi | 351/137 |
| D289,122 S | 4/1987 | Meyer et al. | |
| 4,840,476 A | 6/1989 | Rooney | |
| D305,478 S | 1/1990 | Lahm et al. | |
| 4,896,955 A | 1/1990 | Zider et al. | |
| 4,924,245 A | 5/1990 | Dianitsch | |
| 5,015,087 A | 5/1991 | Baratelli | |
| D318,949 S | 8/1991 | Mawhinney et al. | |
| D322,262 S | 12/1991 | Manus | |
| D330,456 S | 10/1992 | Lehman | |
| D343,402 S | 1/1994 | Scoppettone | |
| 5,369,451 A | 11/1994 | Tamagawa | |
| 5,431,506 A | 7/1995 | Masunaga | |
| D363,603 S | 10/1995 | Leveen et al. | |
| D371,679 S | 7/1996 | Nejman | |
| D379,558 S | 6/1997 | Mischenko et al. | |
| 5,646,707 A | 7/1997 | Arnette | |
| 5,748,280 A | 5/1998 | Herman | |
| D407,591 S | 4/1999 | Bolognia et al. | |
| D418,857 S | 1/2000 | Paulsen et al. | |
| 6,017,119 A | 1/2000 | Huang | |
| D421,526 S | 3/2000 | Isaacson | |
| 6,077,368 A | 6/2000 | Nakamura et al. | |
| D435,340 S | 12/2000 | Kojoori | |
| 6,158,860 A | 12/2000 | Huang | |
| D436,613 S | 1/2001 | Chao | |
| D438,904 S | 3/2001 | Reynolds | |
| 6,264,326 B1 | 7/2001 | Hyoi | |
| D446,237 S | 8/2001 | Koevari | |
| D451,119 S | 11/2001 | Koevari | |
| 6,371,614 B1 | 4/2002 | Herman | |
| 6,773,106 B2 | 8/2004 | Herman | |
| 6,814,226 B2 | 11/2004 | Chao | |
| D503,087 S | 3/2005 | Dzwill et al. | |
| D507,871 S | 8/2005 | DiMarchi et al. | |
| D515,805 S | 2/2006 | Jones | |
| D518,636 S | 4/2006 | Sievers | |
| D527,891 S | 9/2006 | Hoeksema | |
| 7,117,990 B2 | 10/2006 | Sharif | |
| 7,452,070 B2 | 11/2008 | Oskarsson | |
| D585,471 S | 1/2009 | Thompson | |
| 7,484,843 B1 | 2/2009 | Lin | |
| 7,748,843 B2 | 7/2010 | Stewart | |
| D631,246 S | 1/2011 | Boettner | |
| D651,799 S | 1/2012 | Dial | |
| D653,656 S | 2/2012 | Charnas et al. | |
| D669,082 S | 10/2012 | Sato | |
| D684,367 S | 6/2013 | Phillips et al. | |
| D687,376 S | 8/2013 | Farris-Gilbert et al. | |
| D692,236 S | 10/2013 | Ashkenazy | |
| D703,198 S | 4/2014 | Simmer | |
| D703,722 S | 4/2014 | Kim et al. | |
| D713,145 S | 9/2014 | Fathollahi | |
| D714,058 S | 9/2014 | Owen | |
| D714,550 S | 10/2014 | Yoo | |
| D715,052 S | 10/2014 | Fair | |
| D716,045 S | 10/2014 | Requa | |
| D716,049 S | 10/2014 | Fair | |
| D719,950 S | 12/2014 | Smith et al. | |
| D721,493 S | 1/2015 | Godshaw et al. | |
| D726,246 S | 4/2015 | Shalon | |
| D726,413 S | 4/2015 | Shalon | |
| 2001/0028431 A1 | 10/2001 | Rossin | |
| 2001/0055093 A1 | 12/2001 | Saitoh et al. | |
| 2003/0025871 A1 | 2/2003 | Masunaga | |
| 2009/0051868 A1 | 2/2009 | Kwan | |
| 2009/0310080 A1 | 12/2009 | Dellapina | |
| 2012/0140163 A1 | 6/2012 | Hogan | |
| 2012/0218506 A1 | 8/2012 | Perez | |
| 2013/0258269 A1 | 10/2013 | Shalon | |
| 2014/0251839 A1 | 9/2014 | Shalon | |
| 2014/0360898 A1 | 12/2014 | Kantor et al. | |

* cited by examiner

UNIVERSAL EYEWEAR

CROSS REFERENCE TO RELATED APPLICATIONS

This application is a continuation of U.S. application Ser. No. 14/284,879, filed May 22, 2014, now U.S. Pat. No. 9,081,209; which is a continuation-in-part of U.S. application Ser. No. 13/899,606, filed May 22, 2013, now U.S. Pat. No. 9,069,189, which is a continuation of PCT/IB2011/055208, filed Nov. 21, 2011, which international application claimed priority to U.S. Provisional Application No. 61/344,930, filed Nov. 22, 2010.

Application Ser. No. 14/284,879, filed May 22, 2014, also claims the benefit under 35 U.S.C. §119 of U.S. Provisional Application No. 61/826,127, filed May 22, 2013. The disclosures of all of these prior applications are incorporated herein by reference in their entirety.

INCORPORATION BY REFERENCE

All publications and patent applications mentioned in this specification are herein incorporated by reference in their entirety to the same extent as if each individual publication or patent application was specifically and individually indicated to be incorporated by reference.

BACKGROUND

The present invention relates to eyewear and in particular to Pince-Nez eyeglasses (i.e., two lens eyewear lacking temple pieces) that are comfortable, stable and have universal fit while still having full sized optics. The eyeglasses of this invention are also thin, light and easily stored.

There are over 40 million people in the US that use reading glasses known as readers. Current readers typically purchased in a drug store or other mass merchandisers are designed to fit most people by using the nose as a resting place. Since nose width, angle and shape vary considerably among users, standard readers achieve their stability via the temple pieces placed above and behind the user's ears.

Users wear readers at a different place down their nose in order to allow them to look over the lenses of the readers and to change the distance from the lens to the eye to adjust their effective power. The temple pieces of standard readers are usually long enough to accommodate these different positions without loss of stability of the eyeglasses on the user's face.

Most Pince-Nez eyeglasses apply a significant clamping force on the nose in order to stabilize the lenses on the wearer's face. To provide a universal fit, Pince-Nez eyeglasses should accommodate noses of varying sizes and shapes at varying wearing locations while maintaining stability without user discomfort. Many Pince-Nez eyeglass designs fail to meet this standard, however. For example, while attaching Pince-Nez eyeglasses on the pliable tissues over the nostrils might help attach the eyeglasses to any size nose, most users would find this attachment location to be uncomfortable because it restricts breathing, and the glasses would be too far away from the eyes.

Another common problem with readers is their availability when needed. While the temple pieces of standard readers can be folded toward the lenses to reduce the storage size of the eyeglasses, the temple pieces take up storage space, and the overall volume of the storage configuration of the readers may limit their accessibility. Because Pince-Nez eyeglasses do not have temple pieces, they present new opportunities for storage and accessibility.

SUMMARY OF THE DISCLOSURE

The present invention relates to universal Pince-Nez eyeglasses for use as readers and/or as sunglasses. The invention also relates to eyeglasses systems including eyeglasses and storage cases for the eyeglasses.

One aspect of the invention provides an eyewear system including eyeglasses having first and second lenses; first and second nose pads; and a bridge operably connecting the first and second lenses, the bridge being bendable from a bridge rest position to permit relative movement between the first and second nose pads and providing a bridge pinch force of 50 g or less between the nose pads when the nose pads are moved 7 mm or less from the bridge rest position. In some embodiments, the first and second nose pads are operably connected to the first and second lenses, respectively, via connectors adapted to permit relative movement between the first and second nose pads and the first and second lenses, respectively, and providing first and second pad forces resisting relative movement between the first and second nose pads and the first and second lenses from rest positions, the first and second pad forces being less than the bridge pinch force. The first and second nose pads may each have a cantilever extending from its respective connector. In some embodiments, the bridge force is a spring force having a spring constant greater than a spring constant of the cantilever of the first nose pad and the second nose pad.

In some embodiments, the nose pads are adapted to exert less than 150 g/cm$^2$ of pressure on a nose of a user when the eyeglasses are mounted on the nose. The nose pads may each include friction material, such as material having a friction coefficient less than 3.5.

Some embodiments of the eyewear system also include a case adapted to receive the eyeglasses, the case and eyeglasses being sized so that the bridge bends from its rest position when the eyeglasses are within the case. The bridge may be adapted to provide a retention force between the eyeglasses and the case when the eyeglasses are disposed within the case. In some embodiments, the case may also have offset frame guides sized and configured with respect to the eyeglasses to engage and fold the eyeglasses as the eyeglasses are inserted into the case.

In some embodiments, the case may also have a locking element adapted to hold the eyeglasses within the case. The case may also have an opening adapted to receive the eyeglasses, the locking element being disposed to block the opening in a first position and to permit access to the opening in a second position. The case may also have a rotatable connection adapted to permit the locking element to rotate between the first position and the second position.

In some embodiments, the case also has a keychain connector. The keychain connector may be disposed on the locking element.

In some embodiments, the bridge of the eyeglasses has an adjustable at-rest length. In some embodiments the bridge may be connected to the first and second lenses. The bridge may also include first and second adjustable connectors adapted to move with respect to the first and second lenses, respectively, to change an effective length of the bridge.

In some embodiments, the first and second nose pad connectors are connected to the first and second optical lenses, respectively. In some embodiments, the first and second nose pad connectors are adjustable to change a width between the first and second nose pads.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1A:
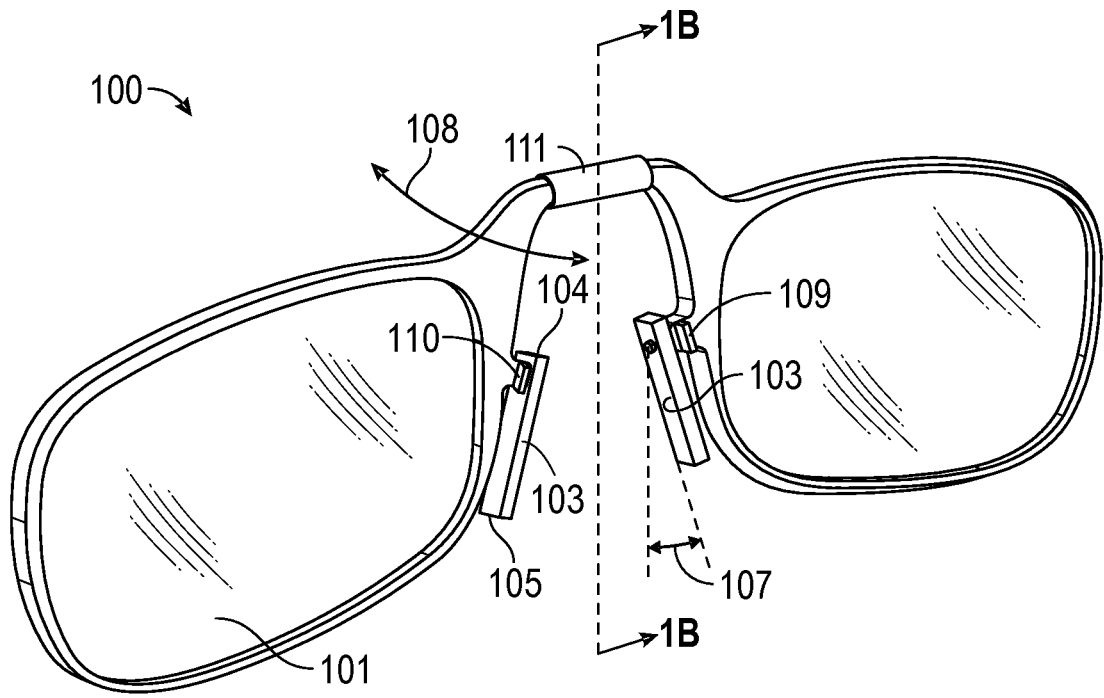
FIG. 1A is a perspective view of Pince-Nez eyeglasses according to one embodiment of the invention.

Prior art Pince-Nez eyewear (see wwwdotendotwikipediadotorg/wiki/Pince-nez) typically utilize nose pads that are directly or indirectly attached to the lenses or lens frame. As a result, any changes to the distance between nose pads affect the distance between the lenses and their angular orientation and position with respect to the eyes, which can induce optical prism, introduce error in the optical cylinder axis or affect the lens aesthetics. The varying distance between the nose pads of prior art Pince-Nez eyewear further changes the nose clamp spring force, resulting in an inconsistent pinch force for different users, an unstable fit for some and discomfort for others. The large pinch force can also lead to tissue ischemia, adding to user discomfort.

The present invention provides eyeglasses that are comfortable and stable on noses of nearly all sizes and shapes. Typical reading glasses weigh over 20 g, even foldable compact versions (e.g., MicroVision) with smaller lenses weigh over 14 g. It will be appreciated that in a Pince-Nez design, the weight of the eyewear is important for both stability on the nose and comfort. Heavier eyewear without ear pieces requires more clamping force to maintain stability on the nose because of the increased weight and the increased mechanical moment which causes instability when the user moves their head up and down or from side to side. Since the clamping force translates to pressure exerted by the nose pads on the tissue, a larger clamping force can lead to user discomfort, pain and in extreme cases, tissue ischemia. Thus, in some embodiments, the eyeglasses reduce the pinching pressure required to maintain a stable position by reducing the mass of the full size optics and hence reducing inertia caused by head movement and gravitational pull and increase the area of the thin nose pads to distribute the force and hence reduce the pressure further.

In addition, some embodiments of the eyewear of this invention optionally increase the friction between the eyewear and the nose skin by utilizing novel nose pad materials. Such eyewear further reduces the clamping force required for stability while reducing the force causing slippage off the nose.

Some embodiments of the Pince-Nez eyewear of this invention provide the nose pinch force with a super elastic bridge spring whose force does not change significantly as a function of nose width. For example, the eyewear may employ thin super elastic alloy wire made from Nitinol to interconnect the lenses (referred to herein as a lens bridge). A superelastic bridge allows repeated transformation from a worn position to a folded position for storage while exerting repeatable, controlled and nearly constant low pinch force for varying bridge deformation cause by varying width noses during wear. This feature combined with use of thin molded polycarbonate lenses results in Pince-Nez reading eyewear a large viewing zone for reading comfortably without lens distortion and without the usability compromises often inflicted by compact reading glasses.

Some embodiments of the Pince-Nez eyewear of this invention provide elongated thin nose pads or folding nose pads whose specific separation distance allows the top of the pad to engage the nose via the force created by bridge spring while the bottom of the nose pad can flex or pivot to accommodate different nose angles and thus prevent the glasses from tipping forward.

One embodiment of the eyeglasses of this invention is shown in FIG. 1. The eyeglasses 100 include full sized lenses 101 over molded on a nitinol wire bridge 102 (NDC, Fremont Calif.) with diameter of 0.010" to 0.030" (e.g., 0.020") covered with an elastomer 111. The lenses may be clear optical lenses for reading glasses or tinted sunglass lenses.

Figure 1B:
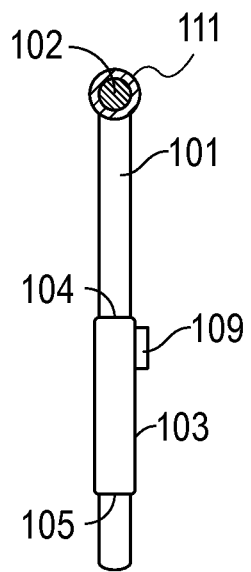
FIG. 1B is a cross-sectional view taken along the line B-B shown in FIG. 1A.

In the embodiment shown in FIGS. 1A and 1B, the lenses 101 are molded polycarbonate optical lenses less than 3 mm thick weighing less than 5 grams for 2.5 diopter full sized reading glasses with lens optical area of over 9 cm$^2$. For lower optical powers or smaller optical area, the lens thickness and reader's weight can be reduced even further. For sunglasses or 3D glasses with no optical power the lenses can be less than 2 mm thick for any optical zone.

The lenses 101 are attached to the super elastic bridge 102, as shown. In alternative embodiments, the lenses can be attached to a frame, with the bridge forming part of the frame or extending between two frame sections.

In the illustrated embodiment, the eyeglasses have nose pads 103 that are no wider than the lens thickness. In this embodiment, the nose pads 103 are 13 mm long (+/−4 mm). Nose pads 103 are attached to the lenses 101 (or, if there is an optional frame, to the frame) at their upper ends 104 and are free at their lower ends 105 to form cantilevers extending downward. In one embodiment, there is a 12 mm (+/−3 mm) separation between the tops 104 of the nose pads 103, and the nose pads 103 extend downward at an angle 107 of 18°+/−4° from the vertical in their rest positions.

In some embodiments, the nose pads are formed from a flexible material, such as 0.005-0.020" (e.g., 0.010") inch thick polycarbonate. In such embodiments, the nose pad material, shape and cantilever connection permit the nose pads 103 to bend with a spring constant that is less than the spring constant of the bridge 102. The nose pads 103 can therefore flex to accommodate the nose geometry while permitting the entire nose pad to maintain contact with the nose.

In some embodiments, a 10 mm long super elastic bridge 102 exerts a pinch force measured at the tops 104 of the nose pads 103 of less than 10 g on a narrow nose width of 12 mm, and less than 50 g (0.05 N) on a large nose width of 19 mm (all measurements+/−20%), as it flexes through angle 108 to accommodate various width noses. The 13.5 mm long nose pads 103 are 2 mm wide providing a total area of 0.24 cm$^2$ and thus average pressure well less than 150 g/cm$^2$.

The nose pads 103 may have an optional friction material (e.g., laminated onto an elastic member, such as the polycarbonate described above) to further increase the stability of the eyeglasses on the nose by minimizing slippage force due to the component of the pinch force along the surface of the skin and rotation moment due to the eyeglasses' center of mass. The friction can be created by low durometer elastomers such as 3M grip tape (GM613, 3M MN, ASTM 1894 coefficient of friction measured against the same material of less than 3.5), silicone, open cell polyurethane, or micro texture sufficient to grip the skin but not to cause discomfort such as textured polymer (polycarbonate embossed with micro machined or micro molded texture) or micro grit impregnated surface (60-400 grit).

Figure 2:
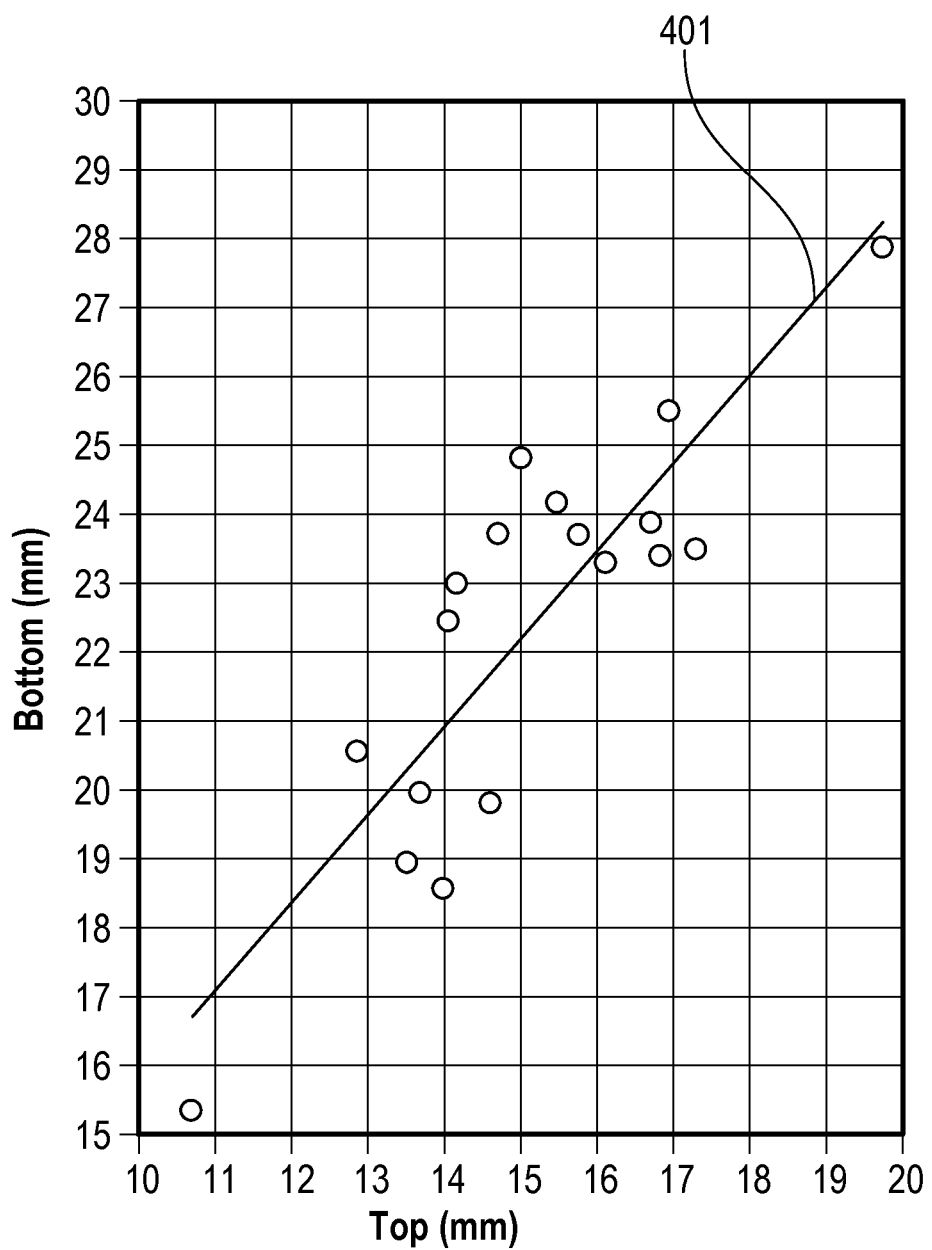
FIG. 2 plots the distance between the tops of the nose pads versus the distance between the bottoms of the nose pads for a variety of users wearing the eyeglasses of FIGS. 1A and 1B.
Figure 3:
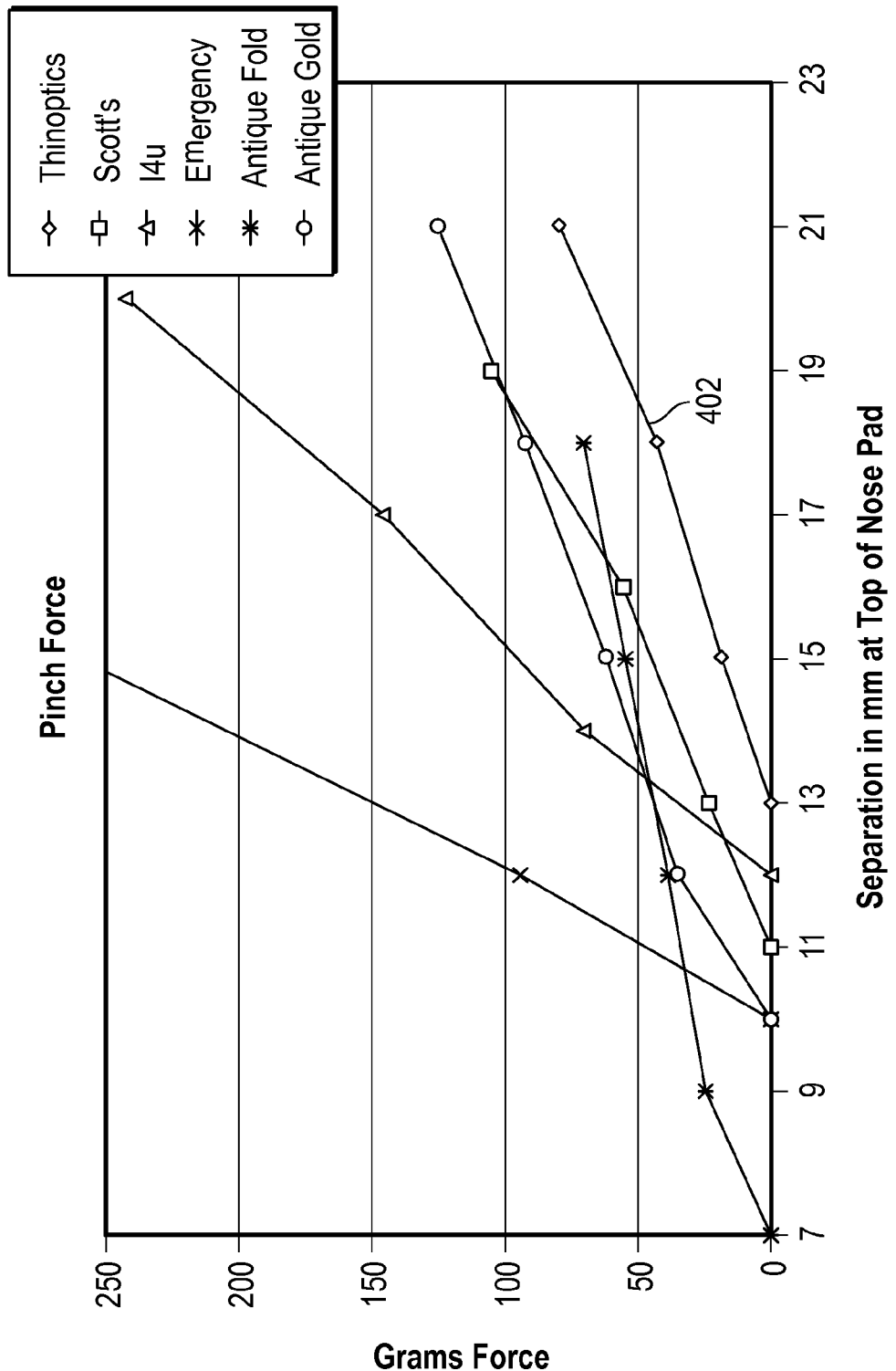
FIG. 3 compares the nose pinch force provided by a variety of Pince-Nez eyeglasses.

Test data comparing various Pince-Nez eyeglass designs are shown in FIGS. 2 and 3. FIG. 2 plots the distance (as determined by optical measurements) between the tops 104 of the nose pad 103 versus the distance between the bottoms 105 of the nose pads 103 for a variety of users (having a variety of nose sizes and shapes) each wearing the eyeglasses embodiment shown in FIGS. 1A and 1B. The average top distance was 16.1 mm (STD 2.4 mm) with a range of 10.6-19.8 mm and a bottom distance of 23.9 mm (STD 3.1) with a range of 15.4-27.9 mm. As can be appreciated from the linear regression line 401, no one line can be drawn so that all the users would experience proper fit. These measurements were made with the test frame positioned on the appropriate location on the nose bridge; in practice, users vary the location of the eyeglasses on their nose based on the task which adds further variability to the data. As observed in many fit studies, if the bottoms of the nose pads contact the nose while the top pads do not due to the angle and separation, the bottom contact point becomes a pivot point and the glasses easily tip over and fall off the face when the user tilts their head downward to read a tablet or menu. If the top of the nose pads contacts the nose, it becomes the pivot point and the glasses tip over making them no longer perpendicular to the visual axis compromising their usefulness.

FIG. 3 compares the nose pinch force (measured at the top of the nosepads) provided by a variety of Pince-Nez eyeglasses. The embodiment shown by FIGS. 1A and 1B is represented by line 402. As can be seen, the eyeglasses of this invention provide lower pinch forces than the other eyeglasses tested across a range of nose sizes.

Figure 4:
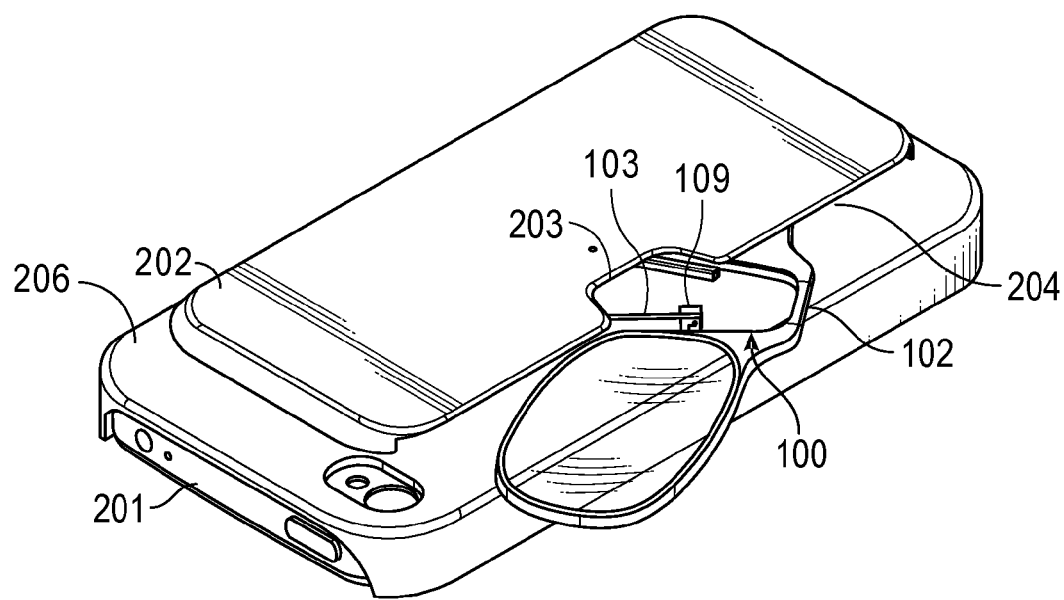
FIG. 4 is a perspective view of an embodiment of eyeglasses and case according to another embodiment of the invention in which the eyeglasses are stored flat.
Figure 8:
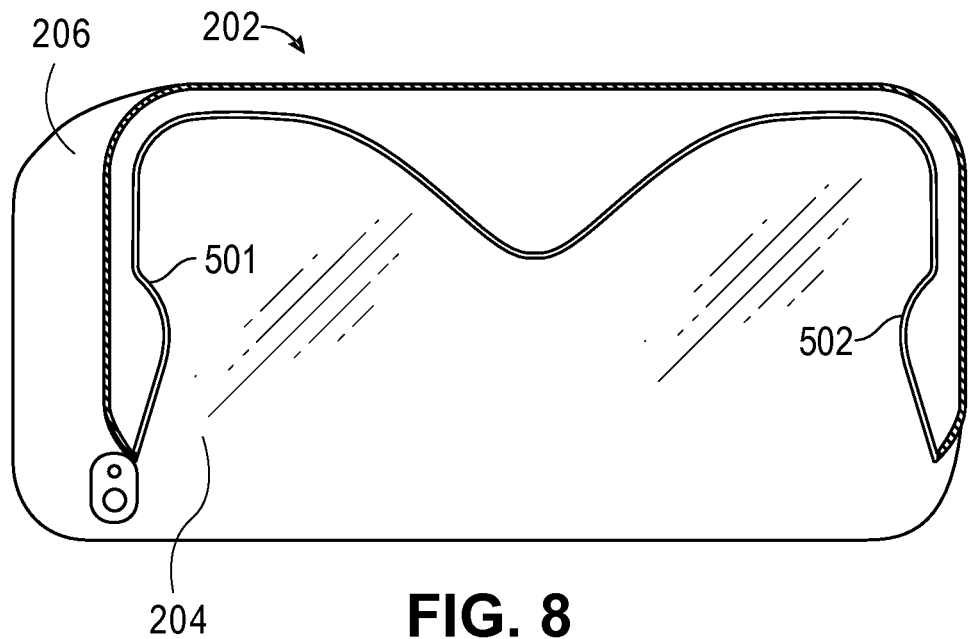
FIG. 8 is sectional view of the case of FIG. 4 without the eyeglasses.

In some embodiments, the eyeglasses are designed to fit in compact storage cases, as discussed in more detail below. For example, the embodiment shown in FIGS. 1A and 1B may be stored flat in a case 202 extending from a housing 206 designed to be attached to the back of a cell phone 201, as shown in FIG. 4. Case 202 has an opening 204 at its top into which the eyeglasses 100 may be inserted. In some embodiments, the eyeglasses 100 are slightly longer than the case 202, and the eyeglasses are therefore bent at the bridge 102 during insertion. In such embodiments, the spring action of the bridge 102 may help retain the eyeglasses in the case. Optional retention features, such as surfaces 501 and 502, may be provided inside the case to hold the eyeglasses within the case, as shown in the cut-away view of FIG. 8. In this optional embodiment, the eyeglasses bend at bridge 102 as they are inserted through opening 204 into case 202, then unbend slightly as the lenses pass surfaces 501 and 502. Likewise, to remove the eyeglasses from case 202, the eyeglasses bend at bridge 102 when the lenses move toward each other as the eyeglasses are pulled through opening 204.

An optional cut-away portion 203 may leave the bridge 102 exposed after insertion so that the eyeglasses may be easily extracted from the case. In some embodiments, protruding portions of the eyeglasses (such as, e.g., features 109 and 110 shown in FIGS. 1A and 1B) may provide a friction fit between the eyeglasses 100 and the inside of case 202. In some embodiments an internal storage volume of the case 202 is less than 14 cm$^3$ for a full 40 mm wide optical zone 2.5 diopter readers stored flat as shown in FIG. 4, and the case 202 is less than 4 mm thick.

Figure 5:
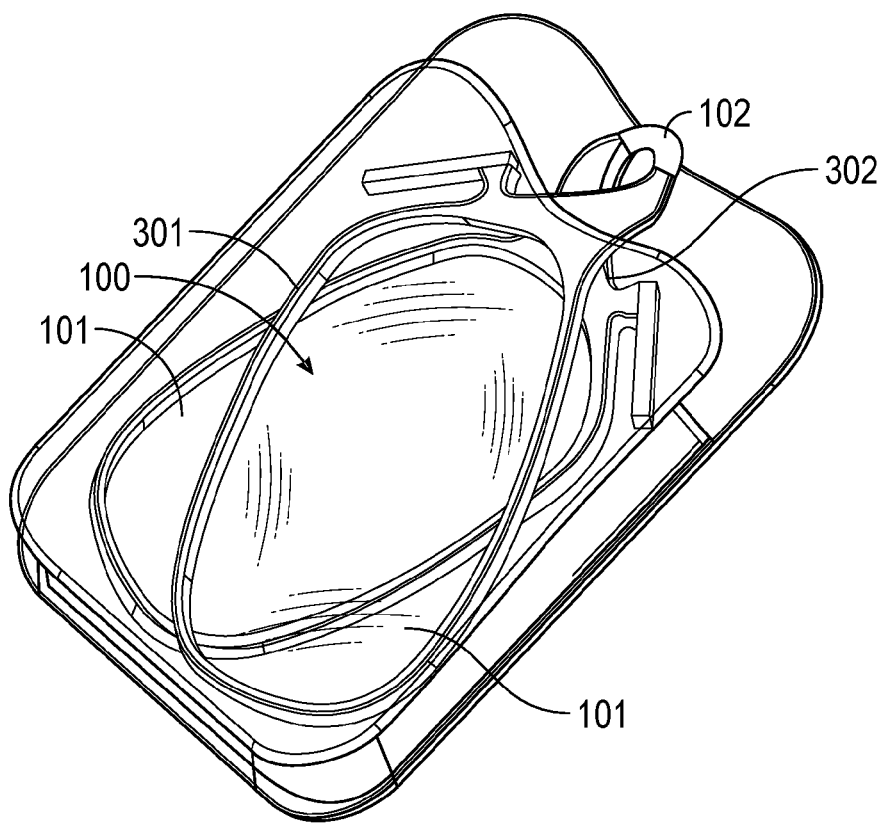
FIG. 5 is an elevational view of an embodiment of eyeglasses and case according to another embodiment of the invention in which the eyeglasses are stored in a folded configuration.
Figure 6:
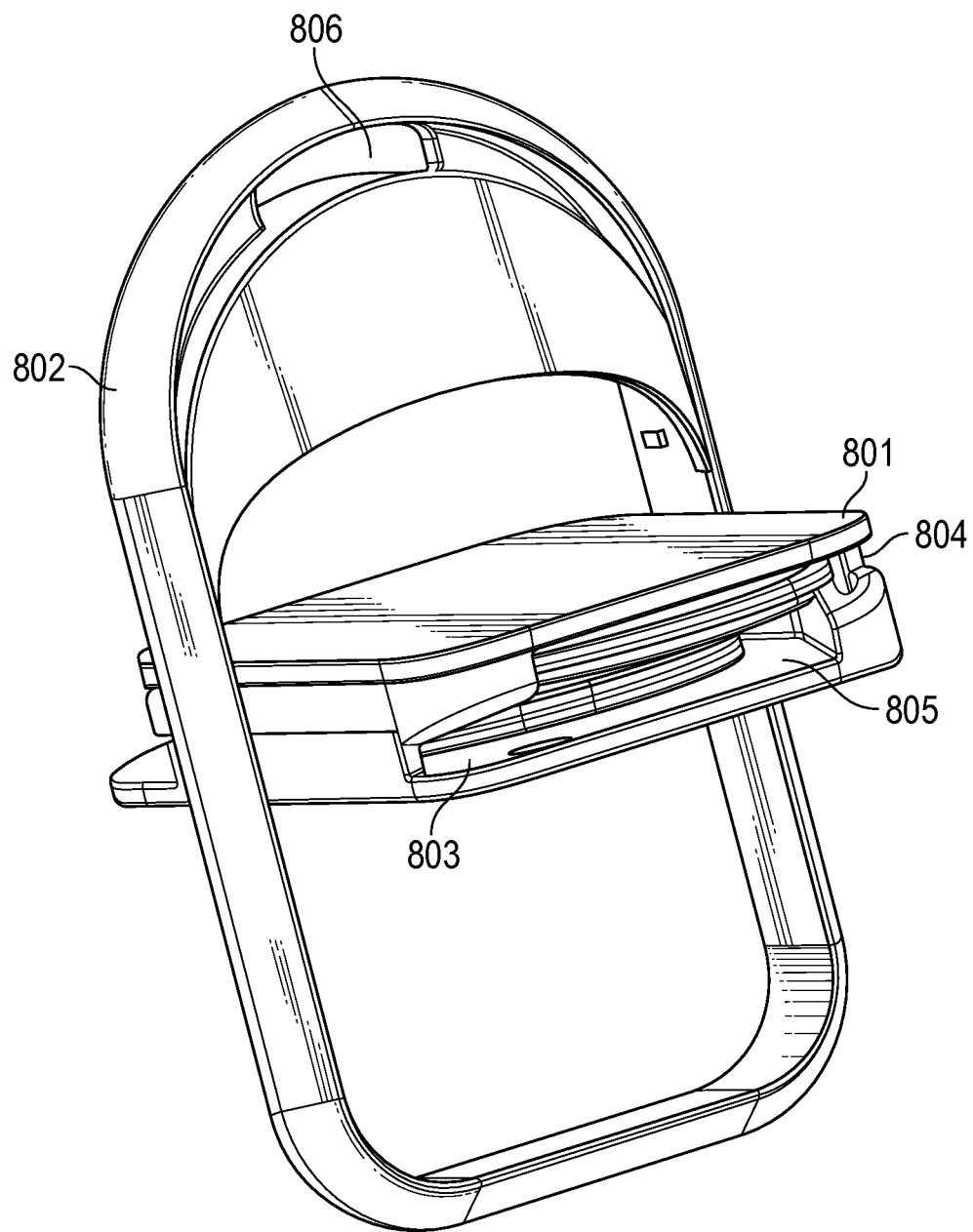
FIG. 6 is a perspective view of an embodiment of eyeglasses and case according to yet another embodiment of the invention in which the eyeglasses are stored in a folded configuration.
Figure 7:
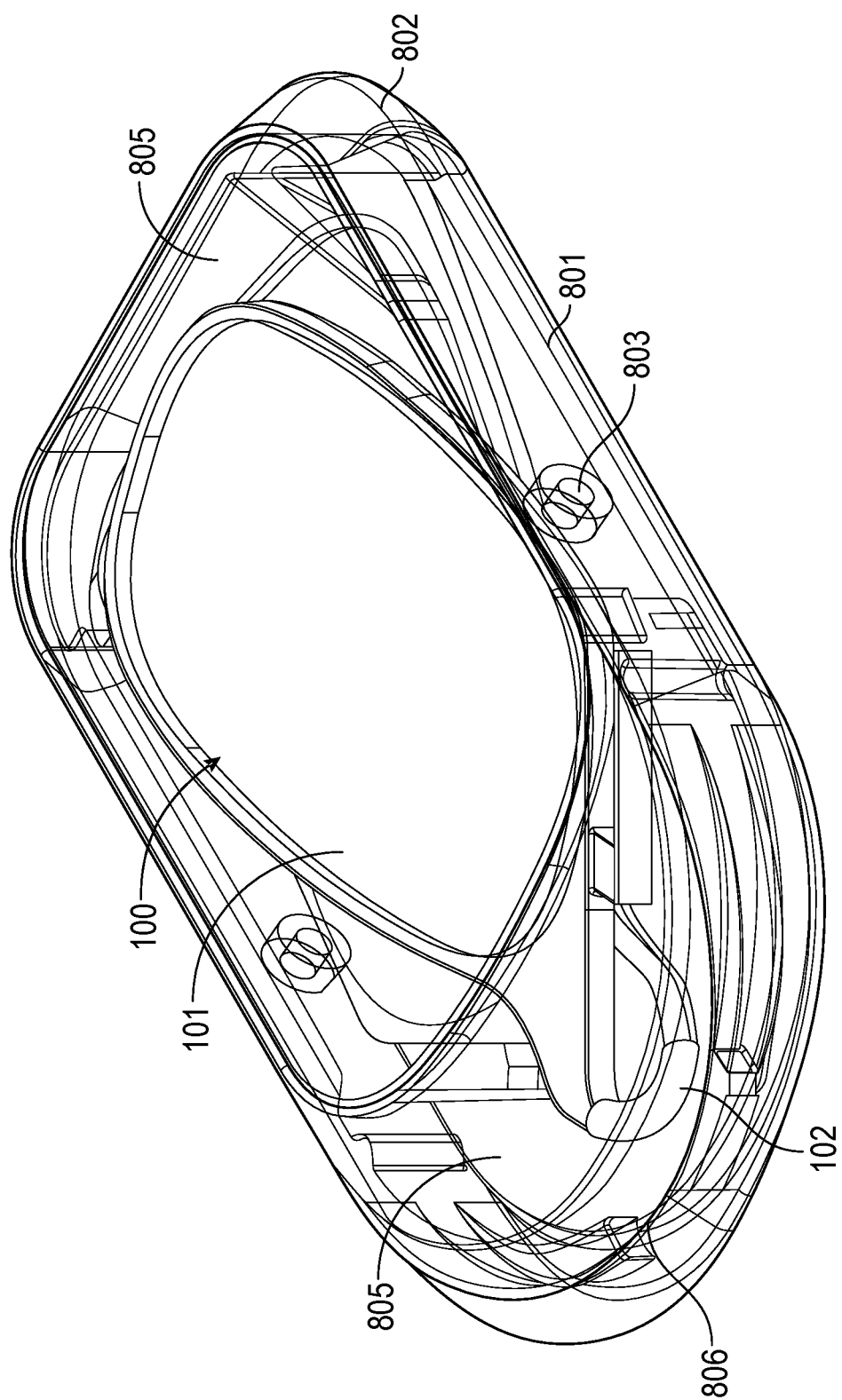
FIG. 7 is a perspective view of the embodiment of FIG. 6 with the locking band in a locked position.

FIGS. 5-7 show embodiments of Pince-Nez eyeglass cases in which the eyeglasses are folded for storage. In FIG. 5, the eyeglasses 100 are bent at the bridge 102 to place one lens 101 over the other lens 101. Eyeglasses 100 may be inserted through an opening 302 on one end of the case 301. The spring force of the superelastic bridge 102 and the friction fit between the eyeglasses and the interior of the case 301 maintain the position of eyeglasses 100 within case 301. Bridge 102 extends through opening 302 as shown to provide structure to grab for removal of eyeglasses 100 from case 301. In this embodiment, the case 301 may be only 9 mm thick or less.

In the embodiments of FIGS. 6 and 7, eyeglasses 100 may be inserted through an opening 804 for storage within an eyeglass case 801. A locking band 802 rotates around pivot 803 to open the case 801 (as shown in FIG. 6) or close it (as shown in FIG. 7). Bridge 102 may be inserted first, as shown, and a pair of optional offset guides 803 and 804 help move the one lens 101 over the other lens 101 as the eyeglasses are advanced into case 801. An optional keychain hook 806 may be provided for attachment of the case to a keychain or other holder. The expanding force of superelastic bridge 102 causes the eyeglasses to move against the internal surfaces of the case and helps retain the eyeglasses in the case.

Figure 9:
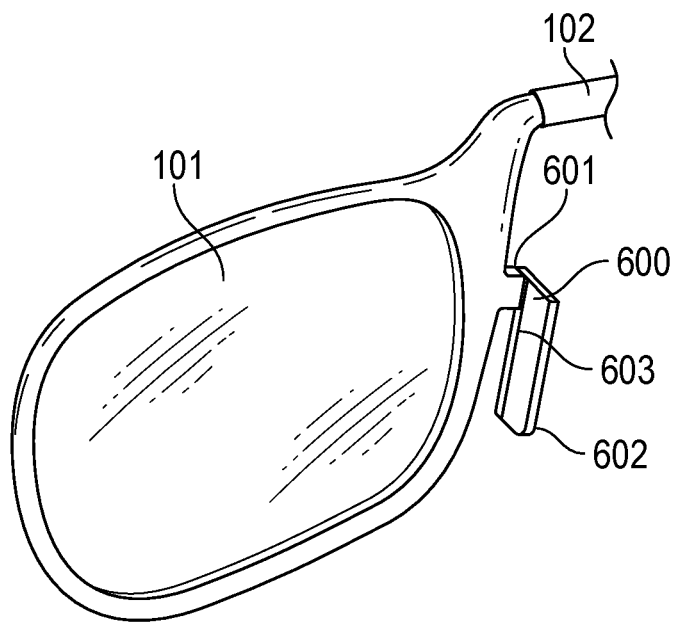
FIG. 9 is a partial perspective view of yet another embodiment of the eyeglasses of this invention.

An alternative embodiment of the eyeglasses is shown in FIG. 9. In this embodiment, the nose pads 600 are wider than the thickness of the lens 101. The nose pads therefore are designed to fold for storage. For eyeglasses intended to be stored flat, the nose pads must fold to a thickness equal to or less than the thickness of the lenses. For eyeglasses intended to be stored in a folded configuration, the nose pads must fold to a thickness equal to or less than the combined thicknesses of the two lenses.

For example, as shown in FIG. 9, the nose pad 600 is formed from a laminate 602 made from friction enhancing material and polycarbonate (0.01" thick) and is attached to the bridge 601 at the top point. Nose pad 600 offers the same spring action described above (i.e., it has a spring constant less than the spring constant of bridge 102) but distributes the pinch force over a larger area. When stored, the nose pad folds along line 603 to become flat.

Figure 10:
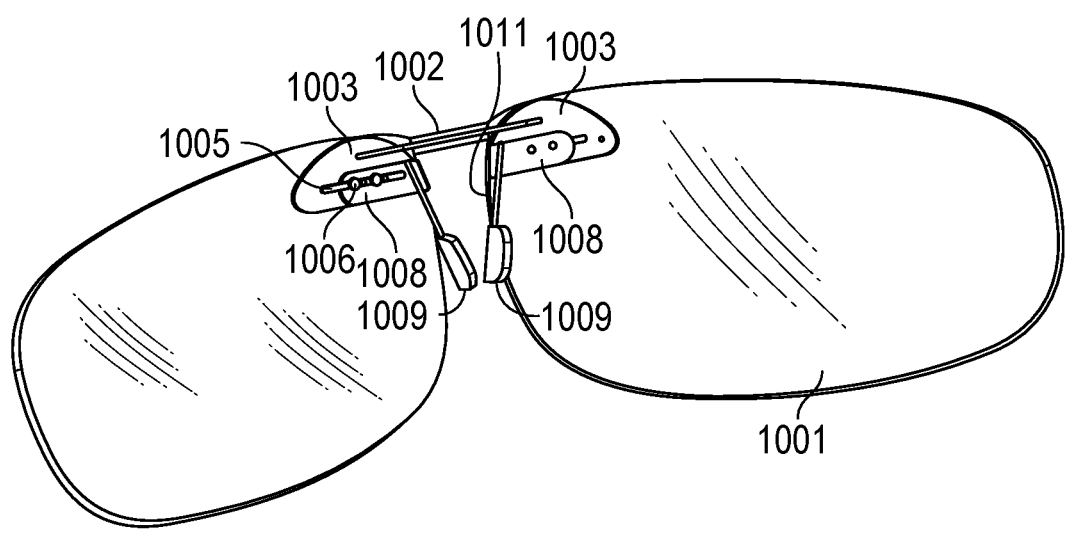
FIG. 10 is a perspective view of another embodiment of the eyeglasses of this invention.

Yet another configuration is shown in FIG. 10. Eyeglasses 1000 have lenses 1001 connected by a superelastic bridge 1002. Nose pads 1009 with friction material facing the nose are connected to the lenses 1001 by nose pad carriers 1008 and super elastic torsion members such as nitinol wires 1011 (0.02" diameter or less) and fold into the plane of the lenses when the lenses are inserted into a case or are folded flat against each other. The torsion element provides the spring force to engage the nose with the pad as well as torsion force to restore this orientation when withdrawn from a case thus making the glasses ultra compact and easy to store and carry.

The embodiment shown in FIG. 10 may be full size sunglasses having a 62 mm wide optical zone and weighing less than 7 g. The sunglasses may be stored in a flat configuration or in a folded configuration, as described above, in a case with an internal volume less than 10 cm$^3$.

The embodiment of FIG. 10 also provides adjustable positions for the bridge 1002 and nose pads 1009 to accommodate a range of nose sizes for a comfortable and secure fit. Superelastic nitinol bridge 1002 is attached to two thin bridge carriers 1003 that can slide on the back surface of the lenses. Plastic or metal rivets 1006 whose heads are trapped by holes on the front of each lens penetrate serrated channels 1005 in the carriers 1003. The rivets are attached to the nose pad carriers 1008 so that as the lenses are pushed toward each other the nose bridge narrows to accommodate narrower noses.

Figure 11:
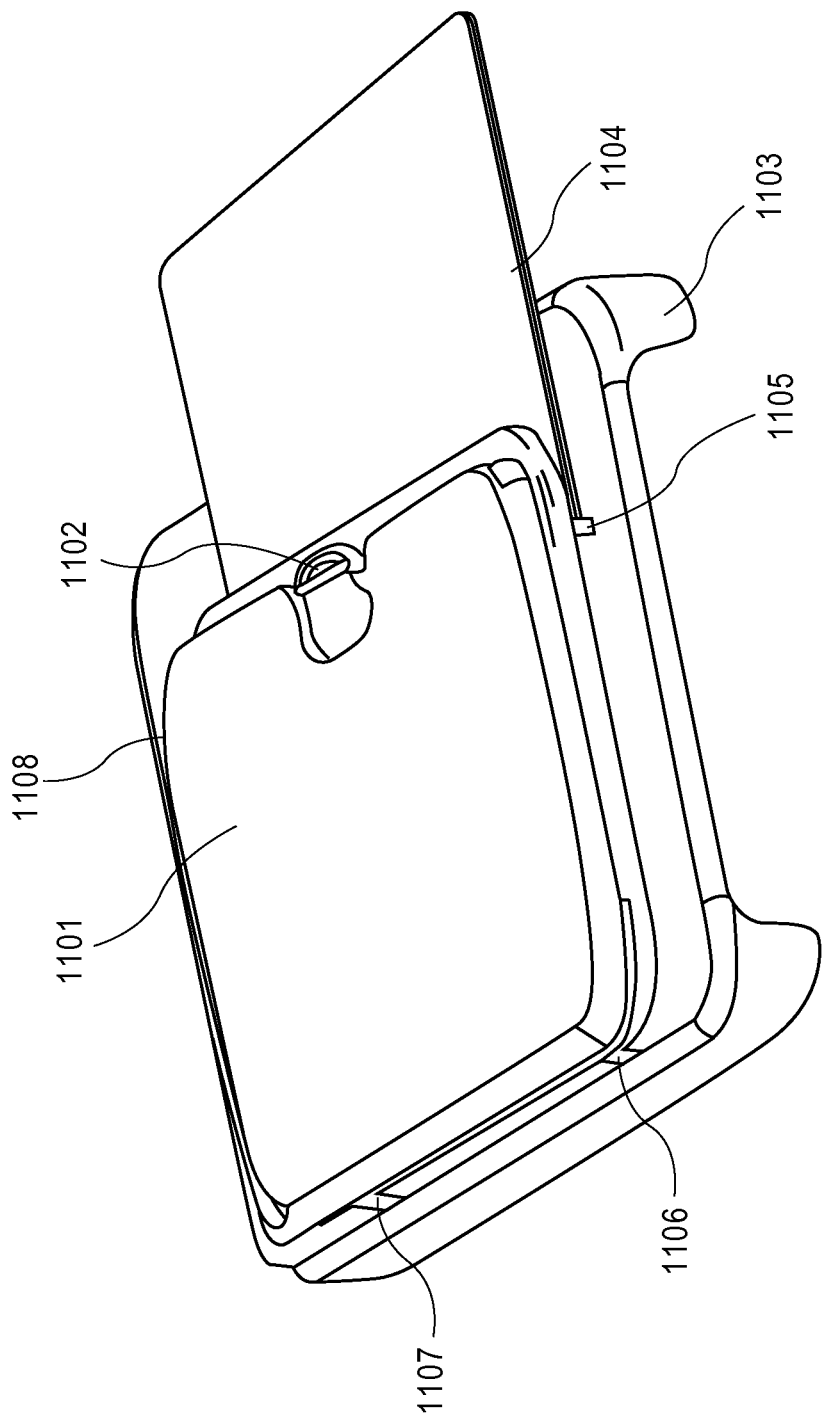
FIG. 11 is a perspective view of yet another case for use with eyeglasses according to this invention.

FIG. 11 shows yet another embodiment of a flat glasses case 1101 attached to a housing 1103 via elastic connections 1105, 1106, 1107, and 1108. Housing 103 may be designed to attach to a cell phone. Elastic connections 1105-1108 permit the distance between case 1101 and housing 1103 to be increased to allow the user to use the space between the glasses case 1101 and the housing 1103 as a compact wallet carrying money, ID or credit cards 1104.

What is claimed is:

1. An eyewear system comprising eyeglasses comprising:
   first and second lenses;
   first and second nose pads operably connected to the first and second lenses, respectively, and adapted to permit relative movement between the first and second nose pads and the first and second lenses, respectively, to provide first and second pad forces resisting relative movement between the first and second nose pads and the first and second lenses from rest positions; and
   a bridge operably connecting the first and second lenses, the bridge being bendable from a bridge rest position to provide a bridge pinch force between the nose pads, the bridge pinch force being greater than the first and second pad forces.

2. The eyewear system of claim 1 wherein the first and second nose pads each comprise a connector and a cantilever extending from the connector.

3. The eyewear system of claim 2 wherein the bridge force is a spring force having a spring constant greater than a spring constant of the cantilever of the first nose pad and the second nose pad.

4. The eyewear system of claim 1 wherein the first and second nose pads each comprise a connector that is adjustable to change a width between resting positions of the first and second nose pads.

5. The eyewear system of claim 1 wherein the nose pads each comprise a friction material having a micro texture surface.

6. The eyewear system of claim 5 wherein the friction material comprises a textured polymer.

7. The eyewear system of claim 5 wherein the friction material comprises a 60-400 grit impregnated material.

8. The eyewear system of claim 1 wherein the bridge is connected to the first and second lenses.

9. The eyewear system of claim 8 wherein the bridge comprises first and second adjustable connectors adapted to move with respect to the first and second lenses, respectively, to change an effective distance between the nose pads.

10. The eyewear system of claim 1 further comprising a case adapted to receive the eyeglasses, the case and eyeglasses being sized so that the bridge bends from its rest position when the eyeglasses are within the case.

11. The eyewear system of claim 10 wherein the case comprises offset frame guides sizes and configured with respect to the eyeglasses to engage and fold the eyeglasses as the eyeglasses are inserted into the case.

12. An eyewear system comprising eyeglasses comprising:
    first and second lenses;
    first and second nose pads each comprising a cantilever operably connected to the first and second lenses, respectively, and adapted to permit relative movement between the first and second nose pads and the first and second lenses, respectively, to provide first and second pad forces resisting relative movement between the first and second nose pads and the first and second lenses from rest positions; and
    a bridge operably connecting the first and second lenses, the bridge being bendable from a bridge rest position to provide a bridge pinch force between the nose pads, the bridge pinch force being greater than the first and second pad forces.

13. The eyewear system of claim 12 wherein the bridge force is a spring force having a spring constant greater than a spring constant of the cantilever of the first nose pad and the second nose pad.

14. The eyewear system of claim 12 wherein the first and second nose pads each comprise an adjustable connector disposed between the cantilever and its respective lens to change a width between the first and second nose pads.

15. The eyewear system of claim 12 wherein the nose pads each comprise a friction material having a micro texture surface.

16. The eyewear system of claim 15 wherein the friction material comprises a textured polymer.

17. The eyewear system of claim 15 wherein the friction material comprises a 60-400 grit impregnated material.

18. The eyewear system of claim 12 wherein the bridge is connected to the first and second lenses.

19. The eyewear system of claim 18 wherein the bridge comprises first and second adjustable connectors adapted to move with respect to the first and second lenses, respectively, to change an effective distance between the nose pads.

20. The eyewear system of claim 12 further comprising a case adapted to receive the eyeglasses, the case and eyeglasses being sized so that the bridge bends from its rest position when the eyeglasses are within the case.

21. The eyewear system of claim 20 wherein the case comprises offset frame guides sizes and configured with respect to the eyeglasses to engage and fold the eyeglasses as the eyeglasses are inserted into the case.

22. A method of mounting eyeglasses on a user's nose, the method comprising:
    bending a bridge of the eyeglasses from a rest position to generate a bridge pinch force, the bridge operably connecting first and second lenses of the eyeglasses;

contacting first and second nose pads with opposite sides of the nose, the first and second nose pads being operably connected to the first and second lenses, respectively;

moving the first and second nose pads with respect to the first and second lenses to generate first and second pad forces less than the bridge pinch force; and applying the bridge pinch force through the nose pads to stably support the eyeglasses on the user's nose.

23. The method of claim 22 wherein the first and second nose pads each comprise a cantilever, the moving step comprising bending the cantilevers of the first and second nose pads.

24. The method of claim 22 further comprising adjusting a position of at least one of the first and second nose pads with respect to a lens of the eyeglasses to change a width between resting positions of the first and second nose pads.

25. The method of claim 22 wherein the nose pads each comprise a friction material having a micro texture surface, the contacting step comprising gripping skin of the user's nose with the micro texture surface.

26. The method of claim 22 further comprising moving the bridge with respect to at least one of first and second lenses of the eyeglasses to change an effective distance between the nose pads.

27. The method of claim 22 further comprising bending the bridge from its rest position while inserting the eyeglasses into a case.

28. The method of claim 27 further comprising engaging the eyeglasses with offset frame guides in the case during the inserting step to fold the eyeglasses.

* * * * *